US009418288B2

(12) United States Patent
Ishikawa et al.

(10) Patent No.: US 9,418,288 B2
(45) Date of Patent: Aug. 16, 2016

(54) GOLF CLUB SELECTION SUPPORT APPARATUS AND SELECTION SUPPORT METHOD

(71) Applicant: BRIDGESTONE SPORTS CO., LTD., Minato-ku, Tokyo (JP)

(72) Inventors: Tatsuya Ishikawa, Chichibu (JP); Hirotada Iwade, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 174 days.

(21) Appl. No.: 14/254,061

(22) Filed: Apr. 16, 2014

(65) Prior Publication Data

US 2014/0357426 A1  Dec. 4, 2014

(30) Foreign Application Priority Data

May 31, 2013  (JP) .................. 2013-116193

(51) Int. Cl.
*A63B 53/00* (2015.01)
*G06K 9/00* (2006.01)
*A63B 69/36* (2006.01)

(52) U.S. Cl.
CPC ........ *G06K 9/00536* (2013.01); *G06K 9/00342* (2013.01); *A63B 69/3632* (2013.01); *A63B 2102/32* (2015.10); *A63B 2220/34* (2013.01); *A63B 2220/40* (2013.01); *A63B 2220/833* (2013.01); *A63B 2225/20* (2013.01); *A63B 2225/50* (2013.01)

(58) Field of Classification Search
None
See application file for complete search history.

(56) References Cited

U.S. PATENT DOCUMENTS

| 8,574,100 B2 | 11/2013 | Hasegawa et al. | |
| 2006/0287118 A1* | 12/2006 | Wright | A63B 24/0003 473/131 |
| 2011/0300959 A1 | 12/2011 | Hasegawa et al. | |
| 2012/0108353 A1 | 5/2012 | Kamino et al. | |
| 2012/0108363 A1 | 5/2012 | Hasegawa et al. | |
| 2012/0108364 A1 | 5/2012 | Hasegawa et al. | |
| 2012/0136464 A1 | 5/2012 | Saito et al. | |
| 2012/0322569 A1* | 12/2012 | Cottam | A63B 69/3617 473/223 |
| 2013/0288829 A1* | 10/2013 | Kimizuka | A63B 53/00 473/409 |

FOREIGN PATENT DOCUMENTS

| JP | 2010-155074 A | 7/2010 |
| JP | 2012-016582 A | 1/2012 |
| JP | 2012-095826 A | 5/2012 |
| JP | 2012-095844 A | 5/2012 |
| JP | 2012-095850 A | 5/2012 |
| JP | 2012-110594 A | 6/2012 |

* cited by examiner

*Primary Examiner* — Jason Yen
(74) *Attorney, Agent, or Firm* — Sughrue Mion, PLLC (57) ABSTRACT

A selection support apparatus acquires a plurality of types of characteristic data representing a swing characteristic of a testing golfer based on a test shot result of a golf club. The apparatus determines a swing type of the testing golfer out of swing types classified in advance based on at least one of the plurality of types of characteristic data. The apparatus calculates a recommended value for the testing golfer in association with a characteristic value that characterizes a component of a golf club based on at least one of the plurality of types of characteristic data. The apparatus selects, based on the swing type of the testing golfer, the recommended value, and component information representing a correspondence between components, the swing types, and the characteristic value, a recommended component from the components listed in the component information.

16 Claims, 8 Drawing Sheets

| TYPE | SWING TYPE | FLEXURAL RIGIDITY (kgf·m$^2$) |
|---|---|---|
| A | a | 3.2 |
| B | a | 4.3 |
| C | a | 5.3 |
| D | b | 5.6 |
| E | b | 4.2 |
| F | c | 5.1 |
| G | d | 3.3 |

| TYPE | FLEXURAL RIGIDITY RATIO | FLEXURAL RIGIDITY (kgf·m²) |
|---|---|---|
| A | 3.0 | 5.5 |
| B | 2.4 | 2.5 |
| C | 2.4 | 5.5 |
| D | 2.0 | 2.0 |

GOLF CLUB SELECTION SUPPORT APPARATUS AND SELECTION SUPPORT METHOD

BACKGROUND OF THE INVENTION

1. Field of the Invention

The present invention relates to a selection support technique for components of a golf club such as a head and a shaft.

2. Description of the Related Art

There has been a growing trend among golfers to desire golf clubs more fitting to themselves. Particularly growing is the tendency to want components such as a head and a shaft fitting to the individuals on a component basis. To meet this requirement, for example, methods of recommending a head or a shaft based on a test shot result have been proposed. Japanese Patent Laid-Open No. 2012-110594 discloses a method of classifying swing types as a premise of selection of a golf club fitting to a golfer.

There exist many types of components circulating in the market, and it is sometimes difficult to narrow down components fitting to a golfer only by classifying swing types. Hence, a method capable of efficiently recommending a component fitting to a golfer is demanded.

SUMMARY OF THE INVENTION

It is an object of the present invention to provide a mechanism capable of efficiently recommending a component fitting to a golfer.

According to the present invention, for example, there is provided a selection support apparatus comprising: a characteristic data acquisition unit configured to acquire a plurality of types of characteristic data representing a swing characteristic of a testing golfer based on a test shot result of a golf club; a determination unit configured to determine a swing type of the testing golfer out of swing types classified in advance based on at least one of the plurality of types of characteristic data; a calculation unit configured to calculate a recommended value for the testing golfer in association with a characteristic value that characterizes a component of a golf club based on at least one of the plurality of types of characteristic data; and a selection unit configured to select, based on the swing type of the testing golfer, the recommended value, and component information representing a correspondence between components, the swing types, and the characteristic value, a recommended component from the components listed in the component information.

Further features of the present invention will become apparent from the following description of exemplary embodiments (with reference to the attached drawings).

DESCRIPTION OF THE EMBODIMENTS

First Embodiment

Figure 1:
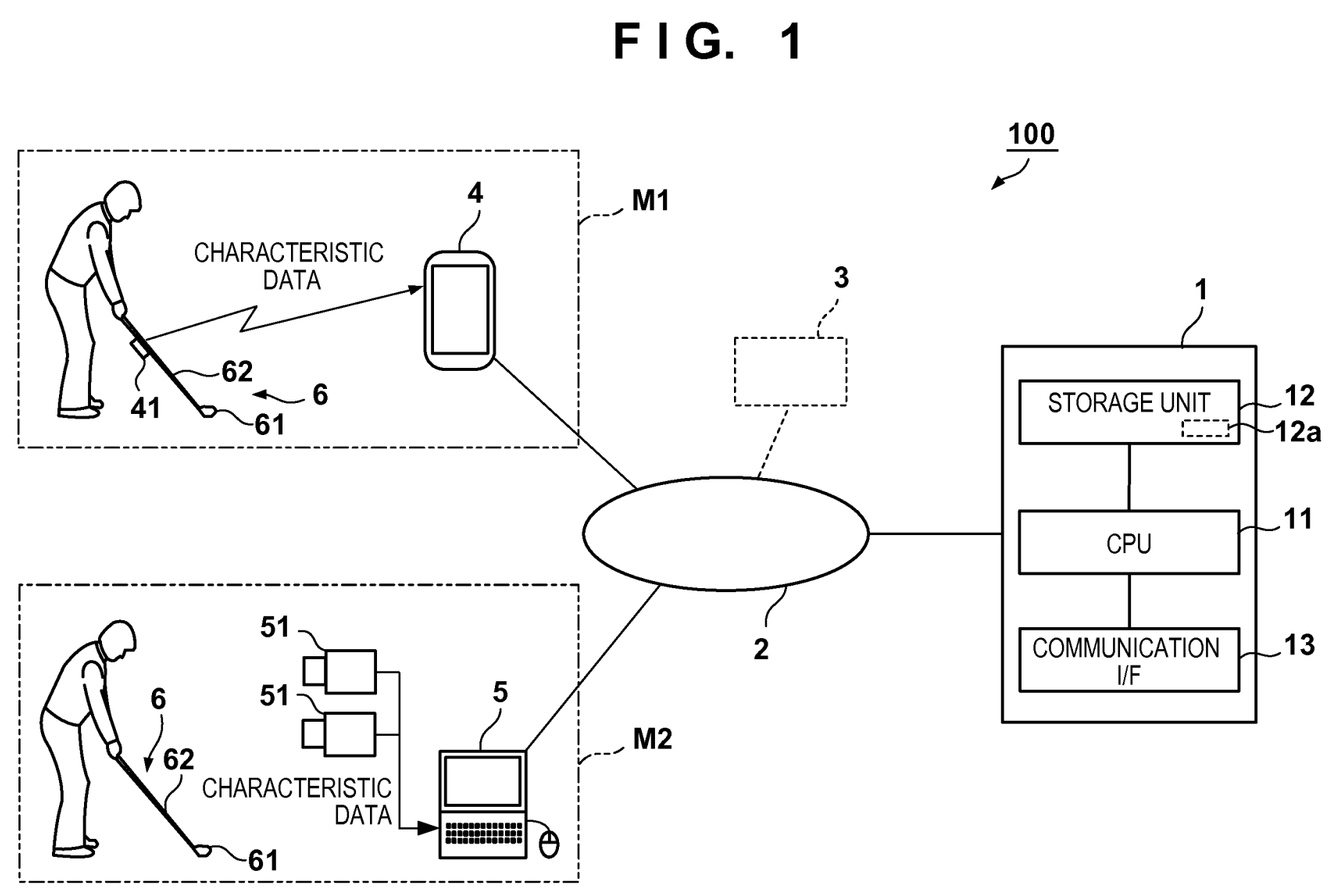
FIG. 1 is an explanatory view of the arrangement of an information distribution system representing an application example of the present invention.

FIG. 1 is an explanatory view of the arrangement of an information distribution system 100 to which a selection support apparatus 1 according to an embodiment of the present invention is applied. The information distribution system 100 distributes information about golf clubs using the selection support apparatus 1 as an information distribution server. The selection support apparatus 1 can communicate with a portable terminal 4 or a personal computer 5 via a network 2. The selection support apparatus 1 receives a request from the portable terminal 4 or the personal computer 5, and transmits information about golf clubs to them. The network 2 is, for example, the Internet.

The selection support apparatus 1 is formed from, for example, a general server computer, and includes a CPU 11, a storage unit 12, and a communication interface 13. The storage unit 12 includes, for example, a RAM, a ROM, a hard disk, and the like. The CPU 11 executes programs stored in the storage unit 12 and, particularly, executes processing associated with selection support of components of a golf club (to be described later). The communication interface 13 is an interface configured to perform data communication with another apparatus (for example, the portable terminal 4 or personal computer 5) via the network 2.

The storage unit 12 stores component information 12a about components of golf clubs. There are various types of golf clubs, and examples are wood type golf clubs such as drivers, utility type (hybrid type) golf clubs, iron type golf clubs, and putters. Examples of components are a head, shaft, grip, and ferrule.

Note that the component information 12a may wholly or partially be stored in a server 3 communicable via the network 2. In this case, the selection support apparatus 1 can access the server 3 via the network 2 and acquire the component information 12a.

The selection support apparatus 1 provides information of components of golf clubs according to the swing characteristic of a testing golfer based on the test shot results of golf clubs. A system for measuring the swing characteristic can have any arrangement. In this embodiment, measurement systems M1 and M2 will be exemplified.

The measurement system M1 includes the portable terminal 4 and a sensor 41 and is suitable for a golfer to personally measure the swing characteristic. The portable terminal 4 is, for example, a smartphone, and has a short distance wireless communication function for the sensor 41 and a wireless communication function via the network 2. The sensor 41 is, for example, a 9-axis sensor (three axes for acceleration, three axes for angular velocity, and three axes for orientation) that is attached to a golf club 6 and measures the three-dimensional behavior of it. The golf club 6 includes a head 61 and a shaft 62. The sensor 41 is attached to, for example, the shaft 62. A golfer conducts a test shot session using the golf club 6 with the sensor 41 in a driving range or the like. The sensor 41 measures the behavior and transmits a plurality of types of characteristic data as a measurement result to the portable terminal 4. The portable terminal 4 directly holds the received characteristic data or converts it to characteristic data of a predetermined format processable on the side of the selection support apparatus 1.

The measurement system M2 includes the personal computer 5 and a plurality of image capturing apparatuses 51 and is suitable to measure the swing characteristic at a golf shop or the like. The personal computer 5 has a function of processing images captured by the image capturing apparatuses 51 and a wireless communication function via the network 2. The image capturing apparatuses 51 are, for example, video cameras. A golfer conducts a test shot session using the golf club 6 in a test shot room or the like. In the test shot room or the like, the plurality of image capturing apparatuses 51 capture the testing golfer from a number of directions and capture the three-dimensional behavior of the golf club 6. The captured images are received and analyzed by the personal computer 5 as characteristic data and converted into a plurality of types of characteristic data of having a predetermined format processable on the side of the selection support apparatus 1.

Figure 2A:
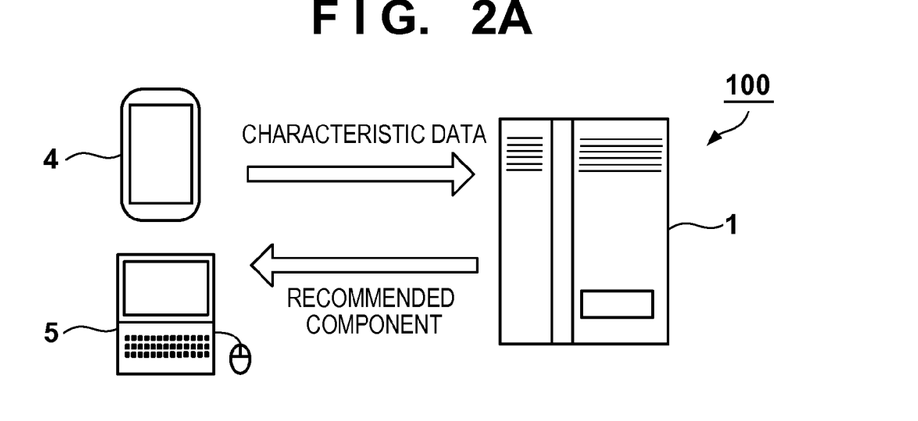
FIG. 2A is an explanatory view of the system shown in FIG. 1.

FIG. 2A is a view giving an outline of information exchange in the information distribution system 100. The above-described measurement system M1 or M2 measures characteristic data representing the swing characteristic of a testing golfer based on a test shot result of a golf club. The portable terminal 4 or the personal computer 5 accesses, for example, a web page provided on the network 2 by the selection support apparatus 1 and transmits the measured characteristic data together with a request to provide information of recommended components of a golf club. The selection support apparatus 1 selects recommended components based on the received characteristic data and transmits the information of the components to the portable terminal 4 or the personal computer 5 of the request source. The testing golfer can obtain, on the portable terminal 4 or the personal computer 5, the information of the components of the golf club according to his/her swing characteristic. This can support the golfer in selecting components.

Figure 2B:
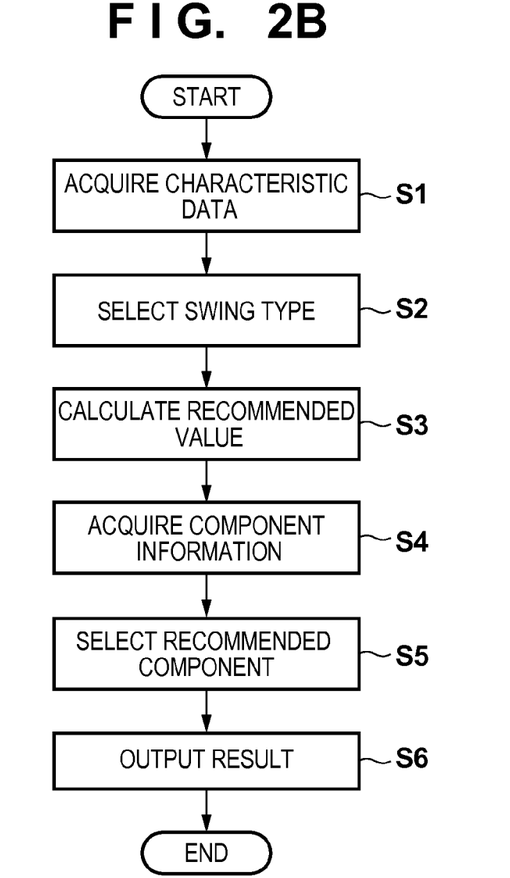
FIG. 2B is a flowchart showing an example of processing executed by a selection support apparatus according to an embodiment of the present invention.

FIG. 2B is a flowchart showing an example of selection support processing executed by the CPU 11 of the selection support apparatus 1. This processing starts upon receiving a recommended component information providing request from the portable terminal 4 or the personal computer 5. In step S1, the CPU acquires a plurality of types of characteristic data representing the swing characteristic of a testing golfer. In this embodiment, the CPU receives characteristic data transmitted from the portable terminal 4 or the personal computer 5 and thus acquires them.

Examples of the characteristic data are a head speed, swing distance difference, swing angle difference, impact face angle, head track in the impact zone, and face change rate in the impact zone. The head speed is the speed of a head immediately before impact, as is widely known, and can be the index of the swing characteristic of a testing golfer associated with the capability of gaining carry.

Figure 3A:
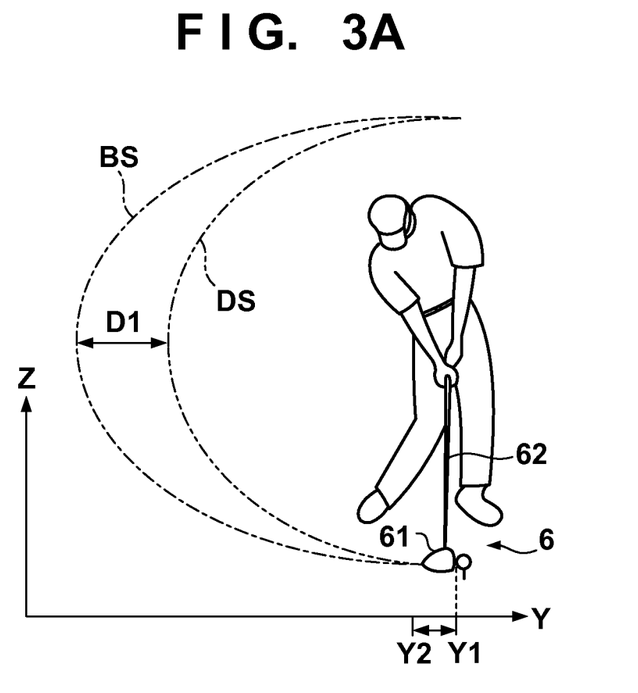
FIGS. 3A and 3B are explanatory views of examples of characteristic data.
Figure 3B:
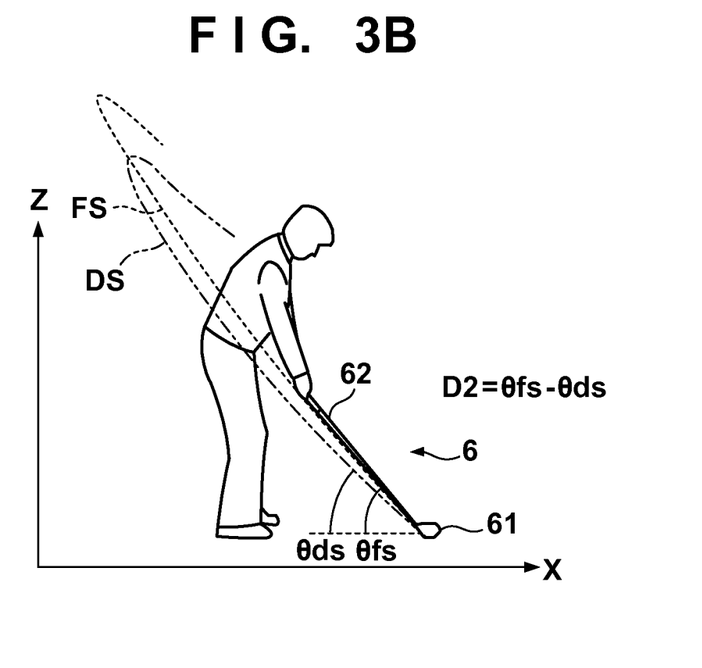

The swing distance difference and the swing angle difference are characteristics associated with the head track during a swing. FIGS. 3A and 3B are explanatory views of examples of these characteristics. As shown in FIGS. 3A and 3B, assume a virtual three-dimensional space having a Y-axis set in the horizontal direction along a target line direction, an X-axis set in the horizontal direction perpendicular to the Y-axis, and a Z-axis set in the vertical direction. Note that the coordinate axes may be set by, for example, defining the moving direction of the head immediately after take back as the Y-axis direction.

The swing distance difference can be defined as, for example, a difference D1 between a track BS of the head 61 in a backswing and a track DS of the head 61 in a downswing when the track of the head 61 of the golf club 6 during a swing is projected onto the Y-Z plane, as shown in FIG. 3A. The difference D1 is the maximum distance difference in the Y direction. The larger the difference D1 is, the larger the effect of power in a swing is. Hence, the golfer tends to be a skilled player. In addition, the head speed tends to be high.

The swing angle difference can be defined as, for example, a difference D2 between an angle θfs of a track FS of the head 61 in a follow swing with respect to the horizontal plane and an angle θds of the track DS of the head 61 in a downswing with respect to the horizontal plane when the track of the head 61 of the golf club 6 during a swing is projected onto the X-Z plane, as shown in FIG. 3B. The angle θfs can be defined as, for example, the angle of a line segment that connects an impact position Y1 and the position of the head 61 moved forward from the impact position Y1 by a predetermined distance in the Y direction with respect to the horizontal plane. Similarly, the angle θds can be defined as, for example, the angle of a line segment that connects the impact position Y1 and the position of the head 61 moved backward from the impact position Y1 by a predetermined distance in the Y direction with respect to the horizontal plane.

As the difference D2 becomes large to the positive side (as the angle θfs becomes large relative to the angle θds), the shot tends to be a hook shot. To the contrary, as the difference D2 becomes large to the negative side (as the angle θfs becomes small relative to the angle θds), the shot tends to be a slice shot.

As described above, the swing distance difference and the swing angle difference can be the indices of the swing characteristic of a testing golfer. Note that the above-described definitions of the swing distance difference and the swing angle difference are merely examples, and can also be defined by another criterion.

The impact face angle, the head track in the impact zone, and the face change rate in the impact zone will be described next with reference to FIGS. 4A and 4B. Note that the impact zone is the head moving range from the impact position to a position moved backward by a predetermined distance, and corresponds to the section (for example, 50 cm) from the impact position Y1 to a position Y2 backward along the target line, as shown in FIG. 3A.

Figure 4A:
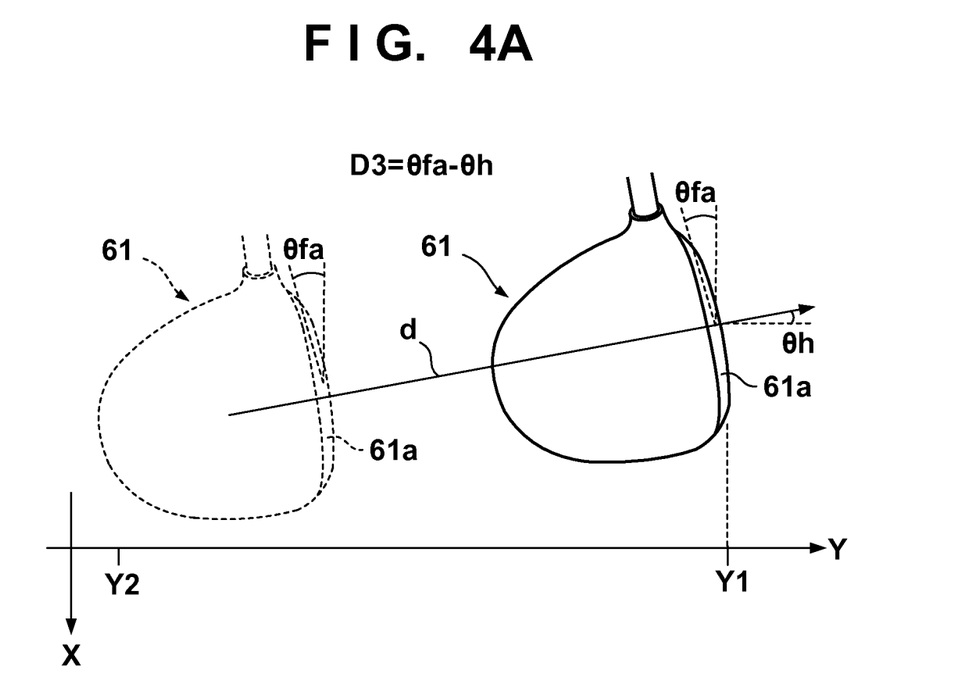
FIGS. 4A and 4B are explanatory views of an example of characteristic data.
Figure 4B:
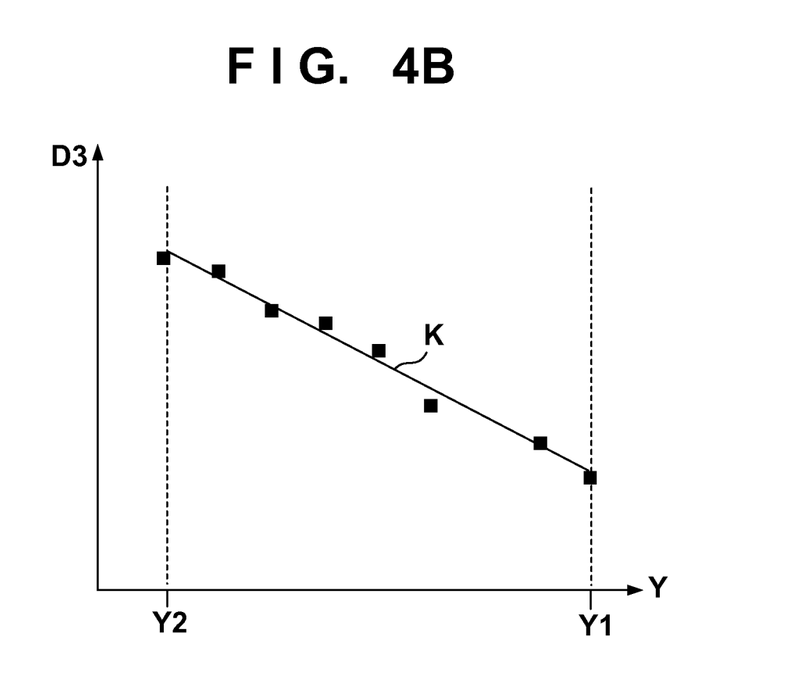

Referring to FIG. 4A, the impact face angle indicates the orientation of a face 61a of the head 61 at the impact position Y1, and is defined as an angle θfa made by the X direction and the face 61a on the X-Y plane in this case. The angle θfa can be regarded as 0 at the time of, for example, address. The larger the impact face angle is, the lower the face control capability of the testing golfer tends to be.

The head track in the impact zone indicates a moving direction d of the head 61 in the impact zone and is represented by, in this case, an angle θh made by the Y direction and the moving direction of the head 61 on the X-Y plane. The moving direction of the head 61 can be defined as, for example, a direction in which the impact position Y1 and the position of the head 61 at the position Y2 are connected. The larger the angle θh is, the stronger the outside-in or inside-out tendency is.

The face change rate in the impact zone indicates the change rate of the orientation of the face 61a with respect to the moving direction d of the head 61 in the impact zone. First, an orientation D3 of the face 61a with respect to the moving direction d of the head 61 is defined as D3=θfa−θh. The orientations D3 are calculated at a plurality of positions of the impact zone and plotted on a coordinate plane whose coordinate axes represent the orientation D3 and the position of the head 61 in the Y direction, respectively, as shown in FIG. 4B. The slope of an approximate line K indicates the face change rate. The higher the face change rate is, the more frequently face rotation tends to occur.

As described above, the impact face angle, the head track in the impact zone, and the face change rate in the impact zone can be the indices of the swing characteristic of a testing golfer.

Note that out of these characteristic data, characteristic data that need to be calculated from measured values at the time of test shot session, such as the face change rate in the impact zone, can be calculated either on the side of the portable terminal 4 or the personal computer 5 or on the side of the selection support apparatus 1.

Referring back to FIG. 2B, in step S2, the CPU determines, based on at least one of the plurality of types of characteristic data acquired in step S1, the testing golfer's swing type out of swing types classified in advance. In this embodiment, swing types are classified into four types, and two types of evaluation indices, the swing distance difference D1 and the swing angle difference D2 are used.

Figure 6A:
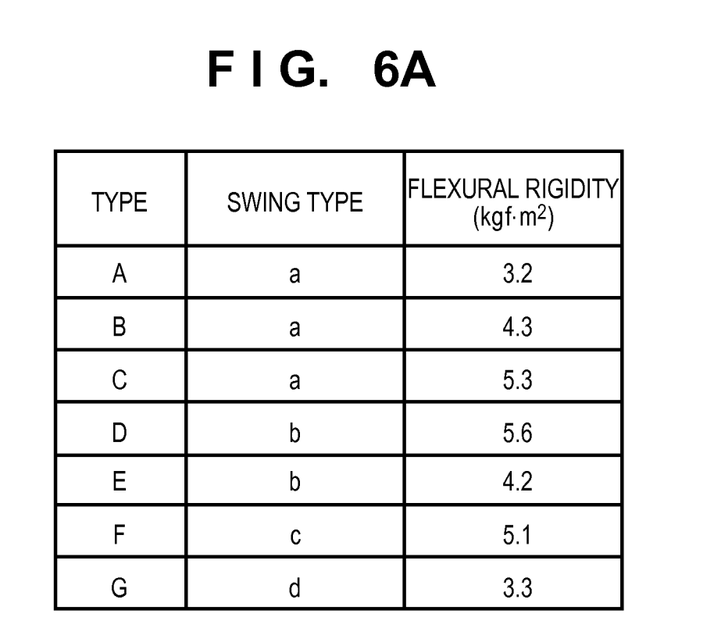
FIG. 6A is a table showing an example of component information.
Figure 6B:
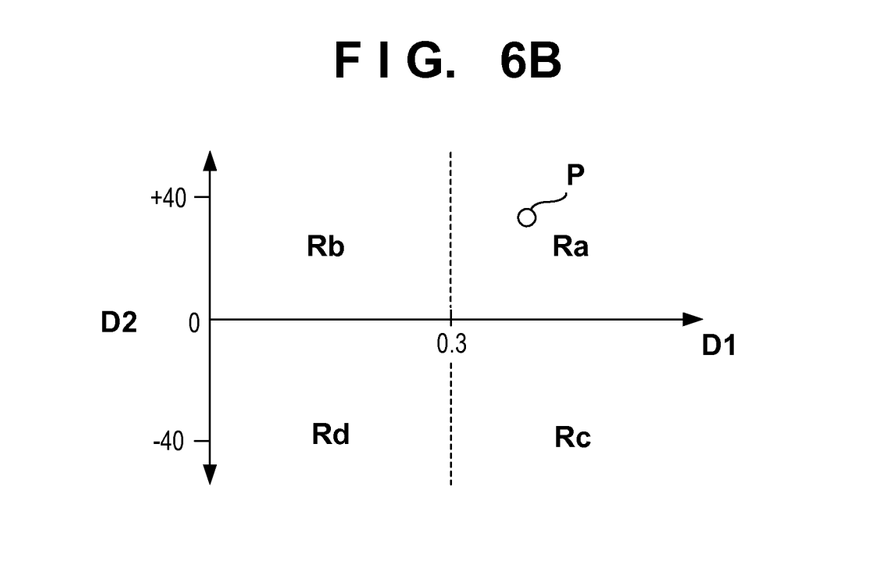
FIG. 6B is an explanatory view of an example of swing type classification.

FIG. 6B is an explanatory view of an example of classification of the four swing types. In FIG. 6B, the swing distance difference D1 is plotted along the abscissa, and the swing angle difference D2 is plotted along the ordinate to form two-dimensional coordinates which are divided into four regions Ra to Rd to classify swing types into four types a to d.

For the swing type a in the region Ra, the swing distance difference D1 is large, and the swing angle difference D2 is large to the positive side. Hence, this is a swing type having a large lag and resulting in a draw. For the swing type b in the region Rb, the swing distance difference D1 is small, and the swing angle difference D2 is large to the positive side. Hence, this is a swing type having a small lag and resulting in a draw. For the swing type c in the region Rc, the swing distance difference D1 is large, and the swing angle difference D2 is large to the negative side. Hence, this is a swing type having a large lag and resulting in a fade. For the swing type d in the region Rd, the swing distance difference D1 is small, and the swing angle difference D2 is large to the negative side. Hence, this is a swing type having a small lag and resulting in a fade.

As one concept, swing types in or close to the region Rd are common to average golfers, and those in or close to the region Ra are common to advanced players.

In the swing type determination of step S2, to which one of the regions Ra to Rd a coordinate P defined by the swing distance difference D1 and the swing angle difference D2 of the testing golfer belongs is determined. In the example of FIG. 6B, since the coordinate P belongs to the region Ra, the swing type of the testing golfer is determined as a.

Referring back to FIG. 2B, in step S3, the CPU calculates recommended values of the testing golfer in association with characteristic values that characterize the components of a golf club based on at least one of the plurality of types of characteristic data acquired in step S1.

Examples of the characteristic values of a shaft are a flexural rigidity, flexural rigidity distribution, flexural rigidity ratio, flex, torque, and weight. The flexural rigidity is the product of the Young's modulus of a shaft material and the geometrical moment of inertia of the shaft. The flexural rigidity distribution is data representing the flexural rigidity of each portion of a shaft. The flexural rigidity ratio is the ratio of flexural rigidities at different positions on a shaft. The flex indicates the hardness of a shaft and is generally categorized stepwise as S, R, X, and the like.

Examples of the characteristic values of a head are a center-of-gravity angle, center-of-gravity distance, center-of-gravity depth, center-of-gravity height, moment of inertia, lie angle, loft angle, head volume, and head weight.

Figure 5A:
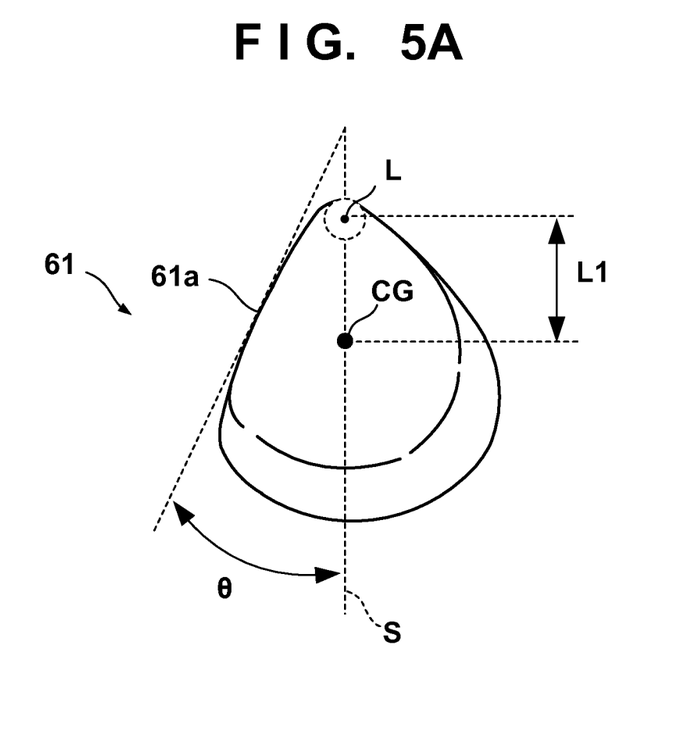
FIGS. 5A and 5B are explanatory views of an example of a characteristic value.

Some terms will be explained, although details are known well. The center-of-gravity angle is the angle made by the vertical direction and the face when a golf club is held to be rotatable about its shaft that is supported horizontally. FIG. 5A is an explanatory view. Referring to FIG. 5A, the center-of-gravity angle is an angle θ made by the face 61a and a vertical broken line S passing through a shaft axis L and a center-of-gravity position CG of the head. As shown in FIG. 5A, when the face 61a is a curved surface, a virtual plane in contact with the face center serves as a reference. The center-of-gravity distance is represented by a length L1 from the center-of-gravity position CG of the head to the shaft axis L, as shown in FIG. 5A.

Figure 5B:
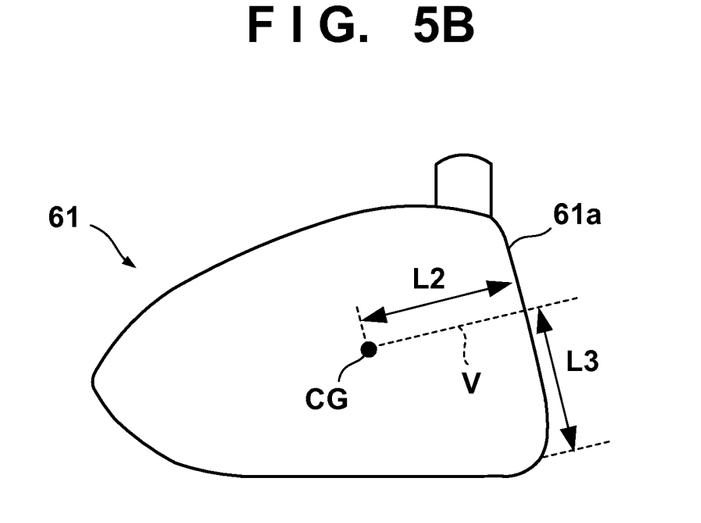

The center-of-gravity depth is represented by a length L2 of a perpendicular V from the center-of-gravity position CG of the head to the face 61a, as shown in FIG. 5B. When the face 61a is a curved surface, a virtual plane in contact with the face center serves as a reference. The center-of-gravity height is represented by a distance L3 between the perpendicular V and the leading edge.

The moment of inertia is the moment of inertia about the axis passing through the center-of-gravity position CG of the head. There are three different ways to set the axis. In this case, the moment of inertia is set about a vertical axis concerning ease of face rotation, unless otherwise specified.

In this embodiment, the characteristic data acquired in step S1 are substituted into a predetermined formula, thereby calculating the recommended values of the testing golfer in association with the characteristic values. In this case, using α and β as coefficients, the recommended values are calculated by $$\text{recommended value} = \text{characteristic data} \times \alpha + \beta \tag{1}$$

By this calculation method, the recommended values can be obtained relatively easily.

A case where a shaft is defined as a selection target, and a recommended shaft is selected based on flexural rigidity as a characteristic value will be described. The flexural rigidity is assumed to be that at a position 550 mm apart from the shaft end. In this case, the head speed is used as characteristic data. Hence, in this embodiment, characteristic data acquisition in step S1 corresponds to acquiring a head speed and characteristic data (swing distance difference D1 and swing angle difference D2) to determine the swing type. In this embodiment, characteristic data used to calculate recommended values of characteristic values and characteristic data used to determine the swing type are of types different from each other. It is therefore possible to narrow down recommended components from many angles and recommend a component more fitting to a golfer.

Let H be the recommended value of the flexural rigidity. The recommended value H can be calculated based on the relationship to the head speed by, for example, $$H(\text{kgf} \cdot \text{m}^2) = \text{head speed}(\text{m/s}) \times 0.15 - 2.5$$

This equation indicates that the higher the head speed is, the higher the flexural rigidity of a shaft to be recommended is.

Referring to FIG. 2B, in step S4, the CPU acquires the component information 12a. In this embodiment, the component information 12a is stored in the storage unit 12 and therefore read out from the storage unit 12. FIG. 6A is a conceptual view showing an example of the component information 12a. In the example of FIG. 6A, seven shaft types A to G are assumed, and their correspondences with swing types a to d suitable for them and the flexural rigidities (position 550 mm apart from the shaft end) as characteristic values are shown. For example, in the shaft A, the suitable swing type is a, and the flexural rigidity is 3.2 (kgf·m$^2$).

Referring back to FIG. 2B, in step S5, a recommended shaft is selected from the components (shafts A to G) listed in the component information 12a based on the swing type of the testing golfer determined in step S2, the recommended value H calculated in step S3, and the component information 12a acquired in step S4.

When selecting a recommended shaft, the swing type of the testing golfer and the characteristic value (flexural rigidity) of a shaft are used as a reference. This makes it possible to easily narrow down shafts and also recommend a more fitting shaft to the golfer who is the testing golfer. Hence, a component fitting to a golfer can be recommended efficiently.

In this embodiment, shafts corresponding to the swing type of the testing golfer are selected first. Then, a shaft having a characteristic value closest to the recommended value H is selected as a recommended shaft. For example, when the swing type of the testing golfer is determined as a, the recommended shafts are narrowed down to the shafts A to C out of the shafts shown in FIG. 6A. When the recommended value H of the testing golfer is 4.2, the shaft B is selected as the recommended shaft.

Note that although one component is recommended in this embodiment, a plurality of components may be recommended. For example, top-two components may be selected.

Referring back to FIG. 2B, in step S6, the selection result in step S5 is output. In this embodiment, the selection result is transmitted to the portable terminal 4 or the personal computer 5 of the recommended component request source. Information to be transmitted may include not only information (for example, component name and maker) that specifies a recommended component but also its characteristic values and the like. The swing type of the testing golfer determined in step S2 or the recommended value calculated in step S3 may also be included.

Processing of one unit thus ends. The golfer (testing golfer) who has requested recommended component selection is given the information of a component fitting to him/her.

Note that in this embodiment, a server-client system including the selection support apparatus 1 as a server and the portable terminal 4 and the personal computer 5 as clients has been described. However, a standalone system may be formed by imparting the functions of the selection support apparatus 1 to the portable terminal 4 or the personal computer 5. In this case, the portable terminal 4 or the personal computer 5 executes the same processing as that shown in FIG. 2B. More specifically, characteristic data acquisition in step S1 is, for example, characteristic data (measurement data) acquisition from the sensor 41 or the image capturing apparatus 51. Result output in step S6 is, for example, displayed by the display panel of the portable terminal 4 or the personal computer 5. The component information 12a can also be stored in the portable terminal 4 or the personal computer 5. However, a form that acquires the component information 12a from the server 3 can also be employed.

In this embodiment, a case where a shaft is selected has mainly been exemplified. However, another component such as a head can also be selected in accordance with the same procedure as described above, as a matter of course. Recommended components can be presented for not only one type of component but also a plurality of types of components (for example, head and shaft). The recommended value H is calculated from one type of characteristic data (head speed). However, one recommended value may be calculated from a plurality of types of characteristic data.

Second Embodiment

In the first embodiment, the swing types of testing golfers are classified into four types based on two types of evaluation indices (swing distance difference D1 and swing angle difference D2). However, the present invention is not limited to this. For example, the swing types may be classified into two types based on one type of evaluation index.

When calculating the recommended value, the coefficients of the formula may individually be set in accordance with the swing type. Furthermore, a recommended component may be selected from the recommended values of a plurality of types of characteristic values. These examples will be described below.

Figure 7A:
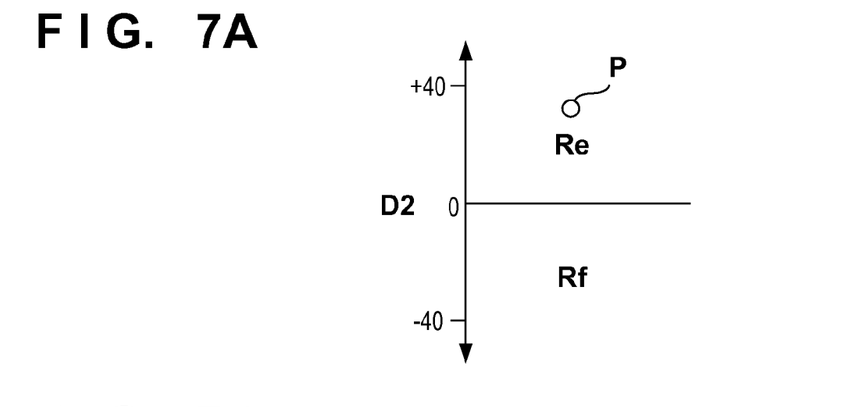
FIG. 7A is an explanatory view of another example of swing type classification.
Figure 7B:
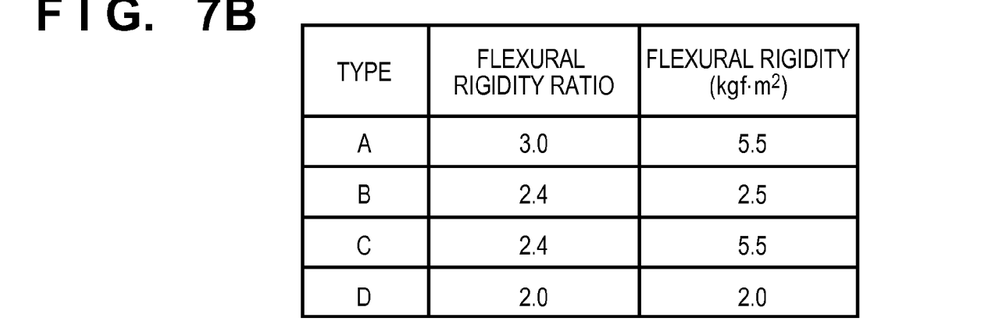
FIG. 7B is a table showing another example of component information.
Figure 7C:
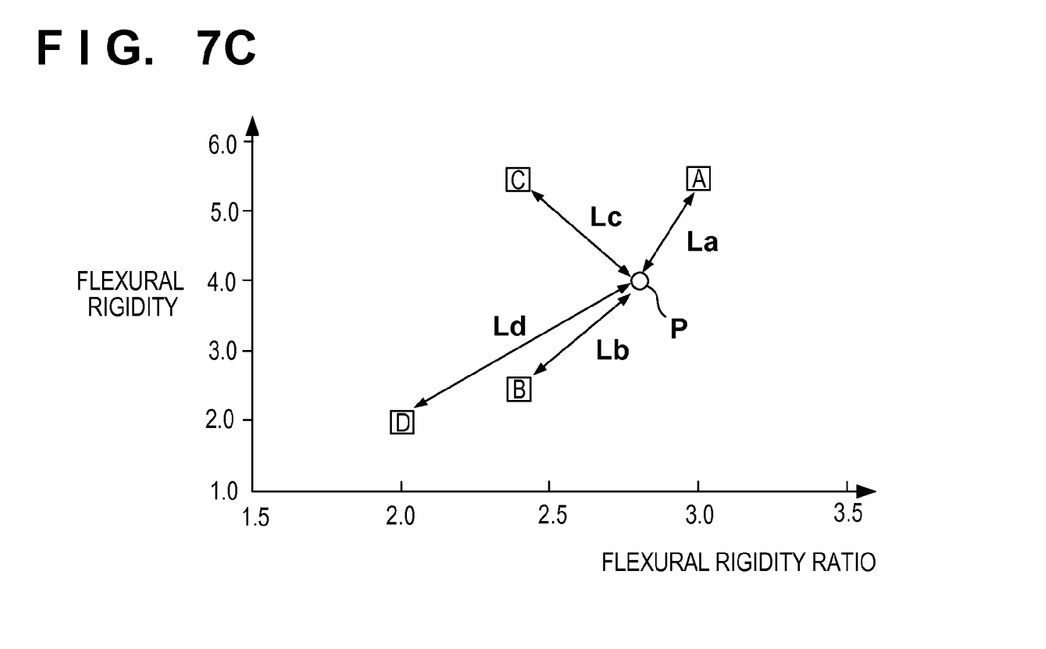
FIG. 7C is an explanatory view of an example of a component selection method.

FIGS. 7A to 7C are an explanatory view of an example of swing type classification according to this embodiment, a table showing component information, and an explanatory view of an example of a component selection method, respectively.

As shown in FIG. 7A, in this embodiment, the coordinates are divided into two regions Re and Rf to classify swing types into two types e and f based on a swing angle difference D2. The example of FIG. 7A indicates a coordinate P representing that the swing angle difference D2 of a testing golfer belongs to the region Re. In swing type determination, the swing type of the testing golfer is determined as e. Note that when the swing angle difference D2 is 0, the swing type is e.

Next, the recommended value of the testing golfer in association with a plurality of types of characteristic values is calculated. A case where a recommended value H1 of the flexural rigidity ratio and a recommended value H2 of the flexural rigidity of a specific portion are calculated will be described. Assume that flexural rigidity ratio=flexural rigidity at a position 300 mm apart from the shaft end÷flexural rigidity at a position 800 mm apart from the shaft end. The flexural rigidity at the specific portion is assumed to be that at a position 550 mm apart from the shaft end, as in the first embodiment.

These recommended values can be calculated in accordance with equation (1). Coefficients α and β can be set in accordance with the swing type.

For example, when the swing type is e, flexural rigidity ratio: $H1$=swing distance difference $D1$ (mm)×α1$e$+β1$e$ flexural rigidity: $H2$ (kgf·m$^2$)=head speed (m/s)×α2$e$+β2$e$ When the swing type is f, flexural rigidity ratio: $H1$=swing distance difference $D1$ (mm)×α1$f$+β1$f$ flexural rigidity: $H2$ (kgf·m$^2$)=head speed (m/s)×α2$f$+β2$f$ The values of the coefficients can be, for example, α1e=1.5, β1e=2.5, α2e=0.15, β2e=−2.0, α1f=1.3, β1f=2.0, α2f=0.13, and β2f=−2.5. When the swing types are different, the characteristic values to be recommended are different even if the head speeds or the swing distance differences D1 are the same. In this way, the coefficients α and β are set in accordance with the swing type. This makes it possible to calculate recommended values more fitting to a golfer in accordance with the difference in the swing type.

Component information 12a is constituted as shown in, for example, FIG. 7B. In the example of FIG. 7B, four shaft types A to D are assumed, and their correspondences with the flexural rigidity ratio and the flexural rigidity as characteristic values are shown. For example, in the shaft A, the flexural rigidity ratio is 3.0, and the flexural rigidity is 5.5 (kgf·m$^2$).

Next, a recommended shaft is selected from the components (shafts A to D) listed in the component information 12a based on the calculated recommended values H1 and H2 and the component information 12a. When selecting a recommended shaft, a plurality of characteristic values (flexural rigidity ratio and flexural rigidity) of a shaft are used as a reference. This makes it possible to easily narrow down shafts and also recommend a more fitting shaft to the golfer who is the testing golfer.

In this embodiment, a shaft having characteristic values closest to the recommended values H1 and H2 is selected as a recommended shaft. The closeness of characteristic values can be discriminated using, as a reference, a distance on multidimensional coordinates with characteristic values plotted along the coordinate axes. Conceptually speaking, recommended components defined by the recommended values are plotted, and components are also plotted. The distances between them are calculated. FIG. 7C shows an example.

The example of FIG. 7C shows two-dimensional coordinates whose coordinate axes represent the flexural rigidity ratio and the flexural rigidity. The position of a point P is decided by the recommended values H1 and H2. Points A to D represent the shafts A to D recorded in the component information 12a, and their positions are decided by the characteristic values recorded in the component information 12a. The distances between the point P and the shafts A to D are indicated by La to Ld, respectively. A shaft corresponding to the shortest one of the distances La to Ld is selected as a recommended shaft. In the example of FIG. 7C, the shaft A is selected. In the above-described way, a shaft having characteristic values closest to the recommended values H1 and H2 can be selected as a recommended shaft. A shaft close to a plurality of types of characteristic values in general can be selected as a recommended shaft.

Note that although one component is recommended in this embodiment, a plurality of components may be recommended. For example, top-two components may be selected.

The formula used to calculate the distance of each component in the component information 12a from a characteristic value can be set based on the Pythagorean theorem as, for example, $$\text{distance} = \sqrt{[\{(\text{characteristic value 1}-\text{recommended value 1})/\gamma\}^2 + \{(\text{characteristic value 2}-\text{recommended value 2})/\delta\}^2]}$$

where γ and δ are weighting coefficients. To equally handle the two types of characteristic values when calculating the distance, for example, the values γ and δ are adjusted. Conversely, priority can be given to some types of characteristic values by setting γ and δ.

Third Embodiment

In the first embodiment, a recommended component of a golf club is selected. However, an arrangement for selecting a recommended golf club including a selected recommended component and presenting it to a golfer can also be employed.

Figure 8A:
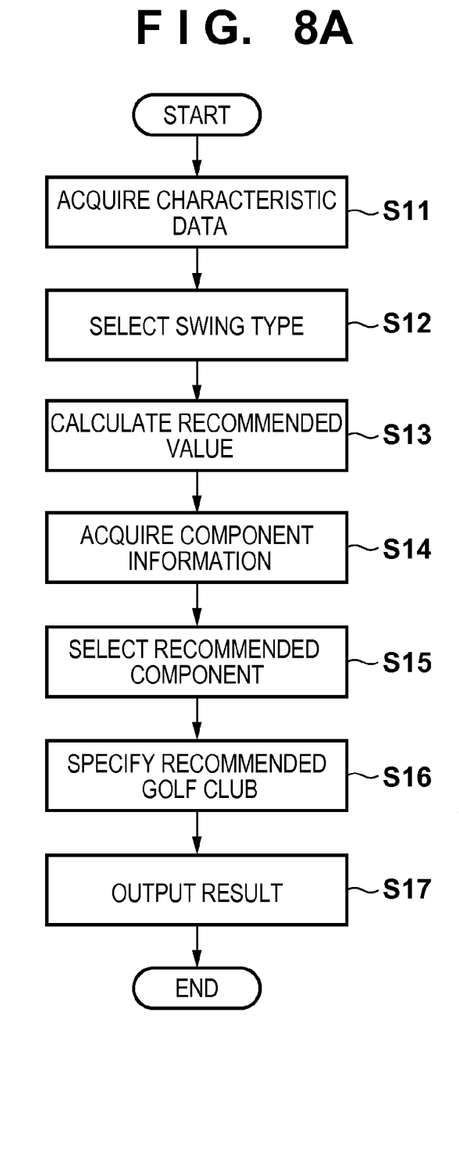
FIGS. 8A and 8B are flowcharts showing other examples of processing.

FIG. 8A is a flowchart showing an example of selection support processing executed by a CPU 11 of a selection support apparatus 1 when presenting a recommended golf club. The processes of steps S11 to S15 are the same as in steps S1 to S5 of the processing of the first embodiment shown in FIG. 2B, and a description thereof will be omitted.

In step S16, the CPU specifies a recommended golf club including a recommended component selected in step S15. For example, when a recommended shaft is selected in step S15, a head, a grip, and the like to be combined with the recommended shaft are selected, thereby specifying a recommended golf club. Other components to be combined with the recommended component selected in step S15 may be defined in component information 12a and selected. For example, shaft types and heads corresponding to them can be defined in the component information 12a, and a head corresponding to a recommended shaft can be selected. Alternatively, shaft types and commercially available golf clubs including them may be defined in the component information 12a, and a commercially available golf club corresponding to a recommended shaft may be selected. In this case, one or a plurality of recommended golf clubs can be selected.

In step S17, the selection results in steps S15 and S16 are output. As in the processing of step S6 of the first embodiment, the selection results can be transmitted to a portable terminal 4 or a personal computer 5 of the request source.

Fourth Embodiment

Figure 8B:
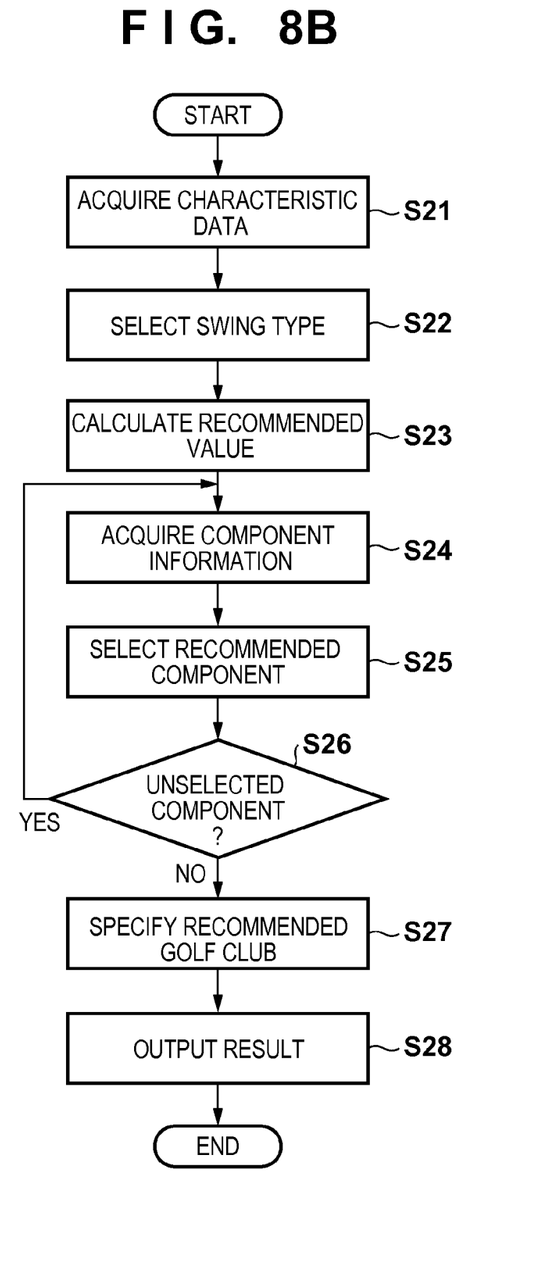

In the processing example shown in FIG. 8A, a recommended component is selected for one component in accordance with the same procedure as in the first embodiment, and other components are selected based on the selected recommended component. However, recommended components may be selected for a plurality of components in accordance with the same procedure as in the first embodiment. FIG. 8B is a flowchart showing an example of selection support processing executed by a CPU 11 of a selection support apparatus 1. Assume a case where a recommended shaft is selected, and a recommended head is then selected. An arrangement for selecting recommended components for all components can also be employed.

The processes of steps S21 to S25 are the same as in steps S1 to S5 of the processing of the first embodiment shown in FIG. 2B, and a recommended component is selected. First, a recommended shaft is selected. In step S26, it is determined whether an unselected component exists. Since a recommended head is unselected, the process returns to step S24 to acquire component information for heads and execute the same processing as described above. In step S25, a recommended head is selected. In next step S26, since selection of the recommended shaft and the recommended head has ended, the process advances to step S27.

Note that in this embodiment, the recommended components are selected one by one. However, a plurality of recommended components (for example, recommended head and recommended shaft) may simultaneously be selected by parallel processing.

In step S27, the CPU specifies a recommended golf club. In this case, the CPU specifies a golf club including the recommended shaft and the recommended head selected in step S25 as a recommended golf club. To select other components such as a grip, the same method as the selection method described concerning step S16 of FIG. 8A can be employed, and a commercially available golf club including the recommended shaft and the recommended head selected in step S25 may be selected.

In step S28, the selection results in steps S25 and S27 are output. As in the processing of step S6 of the first embodiment, the selection results can be transmitted to a portable terminal 4 or a personal computer 5 of the request source.

Other Embodiments

The second embodiment can be combined with the third embodiment or the fourth embodiment.

In the above-described embodiments, a recommended component or a recommended golf club is presented to a golfer. However, the selection support apparatus 1 may receive an order of purchase.

The selection support apparatus 1 can store and manage the test shot results of a golfer. This allows the golfer to compare past test shot results with a current test shot result or compare past recommended components or recommended golf clubs with a current recommended component or recommended golf club.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-116193, filed May 31, 2013, which is hereby incorporated by reference herein in its entirety.

What is claimed is:

1. A selection support apparatus comprising:
a processor; and a storage unit storing computer readable instructions, when executed by the processor, cause the apparatus to:
acquire with a measuring system a plurality of types of characteristic data representing a swing characteristic of a testing golfer based on a test shot result of a golf club;
determine a swing type of the testing golfer out of swing types classified in advance based on at least one of the plurality of types of characteristic data;
convert at least one of the plurality of types of characteristic data to a recommended value for the testing golfer in association with a characteristic value that characterizes a component of a golf club;
select, based on the swing type of the testing golfer, the recommended value, and component information representing a correspondence between components, the swing types, and the characteristic value, a recommended component which fits the testing golfer from the components listed in the component information, and
output information with regard to the recommended component, wherein in the converting, coefficients $\alpha$ and $\beta$ are set in accordance with the swing type; and the recommended value is converted from the characteristic data by recommended value=characteristic data$\times\alpha+\beta$.

2. The apparatus according to claim 1, wherein the computer readable instructions, when executed by the processor, cause the apparatus to specify a recommended golf club including the recommended component, and
the information indicates the recommended golf club.

3. The apparatus according to claim 1, wherein the characteristic data used to determine the swing type of the testing golfer and the characteristic data used to be converted to the recommended value are of types different from each other.

4. The apparatus according to claim 1, wherein the plurality of types of characteristic data include a plurality of types out of
data representing an orientation of a face of a head at a time of impact,
data representing a change rate of a orientation of a face with respect to a moving direction of a head within a head moving range from an impact position to a position moved backward by a predetermined distance,
a head speed,
a head track difference between a backswing and a downswing,
a head track difference between a downswing and a follow swing, and
a head track within a head moving range from a impact position to a position moved backward by a predetermined distance.

5. The apparatus according to claim 1, wherein the plurality of types of characteristic data include data concerning at least one of a head track difference between a backswing and a downswing and a head track difference between a downswing and a follow swing, and
the swing type is determined based on the data concerning the track difference.

6. The apparatus according to claim 1, wherein the plurality of types of characteristic data include at least a head speed, and
the recommended value is converted from the head speed.

7. The apparatus according to claim 1, wherein the plurality of types of characteristic values include a plurality of types out of a center-of-gravity angle of a head, a moment of inertia of a head, a center-of-gravity distance of a head, a center-of-gravity depth of a head, a center-of-gravity height of a head, a lie angle of a head, a loft angle of a head, a head volume, a head weight, a flexural rigidity of a shaft, a flexural rigidity distribution of a shaft, a flex of a shaft, a torque of a shaft, and a weight of a shaft.

8. The apparatus according to claim 1, wherein the characteristic value includes at least a flexural rigidity of a shaft.

9. The apparatus according to claim 1, wherein as the recommended component, the component corresponding to the swing type of the testing golfer and having the characteristic value closest to the recommended value is selected.

10. The apparatus according to claim 1, wherein the swing type is determined based on a plurality of types of data among the plurality of types of characteristic data.

11. The apparatus according to claim 1, wherein in the converting, plurality of types of data among the plurality of types of characteristic data are converted to first and second recommended values for the testing golfer in association with first and second characteristic values which characterize a component of a golf club, and
wherein in the selecting,
first components are selected based on the swing type of the testing golfer from the components listed in the component information;
the recommended component is selected from the first components based on a parameter, and
the parameter is calculated, using $\gamma$ and $\delta$ as coefficients, by parameter=$\sqrt{[\{(\text{first characteristic value}-\text{first recommended value})/\gamma\}^2+\{(\text{second characteristic value}-\text{second recommended value})/\delta\}^2]}$.

12. The apparatus according to claim 1, wherein in the selecting, a plurality of types of recommended components are selected from the components listed in the component information, and the plurality of types of recommended components include at least a recommended head and a recommended shaft.

13. A selection support method executed by a computer, comprising:
- a characteristic data acquisition step of acquiring with a measuring system a plurality of types of characteristic data representing a swing characteristic of a testing golfer based on a test shot result of a golf club;
- a determination step of determining a swing type of the testing golfer out of swing types classified in advance based on at least one of the plurality of types of characteristic data;
- a converting step of converting at least one of the plurality of types of characteristic data to a recommended value for the testing golfer in association with a characteristic value that characterizes a component of a golf club;
- a selection step of selecting, based on the swing type of the testing golfer, the recommended value, and component information representing a correspondence between components, the swing type, and the characteristic value, a recommended component which fits the testing golfer from the components listed in the component information, and
- an output step of outputting information with regard to the recommended component,
- wherein in the converting step, coefficients $\alpha$ and $\beta$ are set in accordance with the swing type; and the recommended value is converted from the characteristic data by recommended value=characteristic data$\times\alpha+\beta$.

14. The method according to claim 13, wherein in said determination step, the swing type is determined based on a plurality of types of data among the plurality of types of characteristic data.

15. The method according to claim 13, wherein in said selection step, a plurality of types of recommended components are selected from the components listed in the component information, and
the plurality of types of recommended components include at least a recommended head and a recommended shaft.

16. A selection support method executed by a computer, comprising:
- a characteristic data acquisition step of acquiring with a measuring system a plurality of types of characteristic data representing a swing characteristic of a testing golfer based on a test shot result of a golf club;
- a determination step of determining a swing type of the testing golfer out of swing types classified in advance based on at least one of the plurality of types of characteristic data;
- a converting step of converting at least one of the plurality of types of characteristic data to a recommended value for the testing golfer in association with a characteristic value that characterizes a component of a golf club;
- a selection step of selecting, based on the swing type of the testing golfer, the recommended value, and component information representing a correspondence between components, the swing type, and the characteristic value, a recommended component which fits the testing golfer from the components listed in the component information, and
- an output step of outputting information with regard to the recommended component,
- wherein in the converting step, plurality of types of data among the plurality of types of characteristic data are converted to a first and second recommended values for the testing golfer in association with a first and second characteristic values which characterize a component of a golf club, and wherein in the selection step, first components are selected based on the swing type of the testing golfer from the components listed in the component information;
- the recommended component is selected from the first components based on a parameter, and the parameter is calculated, using $\gamma$ and $\delta$ as coefficients, by parameter=$\sqrt{[\{(\text{first characteristic value}-\text{first recommended value})/\gamma\}^2+\{(\text{second characteristic value}-\text{second recommended value})/\delta\}^2]}$.

* * * * *